United States Patent
Liang et al.

(10) Patent No.: US 12,083,930 B2
(45) Date of Patent: Sep. 10, 2024

(54) POWER BATTERY HEATING SYSTEM AND METHOD USING SOLAR SUNROOF ENERGY

(71) Applicant: Volvo Car Corporation, Gothenburg (SE)

(72) Inventors: Haibo Liang, Shanghai (CN); Xi Wang, Shanghai (CN); Chenchen Wang, Shanghai (CN); Changzheng Shao, Shanghai (CN)

(73) Assignee: Volvo Car Corporation, Gothenburg (SE)

( * ) Notice: Subject to any disclaimer, the term of this patent is extended or adjusted under 35 U.S.C. 154(b) by 806 days.

(21) Appl. No.: 17/037,805

(22) Filed: Sep. 30, 2020

(65) Prior Publication Data

US 2021/0107379 A1    Apr. 15, 2021

(30) Foreign Application Priority Data

Oct. 11, 2019   (CN) .......................... 201910961998.4

(51) Int. Cl.
*B60L 58/27* (2019.01)
*B60L 50/60* (2019.01)
(Continued)

(52) U.S. Cl.
CPC .............. *B60L 58/27* (2019.02); *B60L 50/60* (2019.02); *B60L 53/51* (2019.02); *B60L 53/60* (2019.02);
(Continued)

(58) Field of Classification Search
None
See application file for complete search history.

(56) References Cited

U.S. PATENT DOCUMENTS

| 2010/0090527 A1 | 4/2010 | Tarnowsky et al. |
| 2013/0253781 A1* | 9/2013 | Li .............................. E02F 9/20 701/50 |

(Continued)

FOREIGN PATENT DOCUMENTS

| CN | 107181022 A | 9/2017 | |
| CN | 105896676 B * | 6/2018 | ............ H02J 7/0036 |

(Continued)

OTHER PUBLICATIONS

Machine translation of CN 105896676 B performed on Jun. 20, 2023, Yin et al. (Year: 2018).*

(Continued)

*Primary Examiner* — Dana Ross
*Assistant Examiner* — Kevin Guanhua Wen
(74) *Attorney, Agent, or Firm* — Clements Bernard Walker; Christopher L. Bernard

(57) ABSTRACT

A power battery heating system of an electric vehicle including: a heating module configured to heat the power battery of the electric vehicle; a solar sunroof; and a sunroof control unit configured to control the operation of the heating module and the electric energy output of the solar sunroof; wherein the heating system is configured to start a power battery heating operation based on the solar sunroof when the power battery is not in a high voltage output state and the temperature of the power battery is lower than a temperature threshold, the power battery heating operation including: controlling the solar sunroof to output electric energy to the heating module such that the heating module performs the heating of the power battery using the electric energy from the solar sunroof.

20 Claims, 2 Drawing Sheets

(51) Int. Cl.
  *B60L 53/51*   (2019.01)
  *B60L 53/60*   (2019.01)
  *B60L 58/12*   (2019.01)
  *B60K 6/28*    (2007.10)

(52) U.S. Cl.
  CPC ............... *B60L 58/12* (2019.02); *B60K 6/28* (2013.01); *B60L 2240/545* (2013.01); *B60Y 2200/91* (2013.01); *B60Y 2200/92* (2013.01); *B60Y 2400/216* (2013.01)

(56) References Cited

U.S. PATENT DOCUMENTS

| | | | | |
|---|---|---|---|---|
| 2018/0123357 A1* | 5/2018 | Beaston et al. | ............ | H02J 7/00 |
| 2018/0304765 A1* | 10/2018 | Newman et al. | ........ | B60L 11/18 |
| 2019/0081502 A1* | 3/2019 | Botts et al. | ................ | H02J 7/35 |

FOREIGN PATENT DOCUMENTS

| | | | | | |
|---|---|---|---|---|---|
| CN | 108263244 A | * | 7/2018 | .............. | B60L 53/31 |
| CN | 109755689 A1 | * | 5/2019 | .............. | Y02E 60/10 |
| JP | 2013110897 A | | 6/2013 | | |
| WO | WO 2016086274 A1 | * | 6/2016 | ............... | B60K 1/04 |
| WO | WO 2017218218 A1 | * | 12/2017 | ........ | H01M 10/6572 |
| WO | WO 2018157599 A1 | * | 9/2018 | .............. | B60L 8/003 |
| WO | WO-2019062935 A1 | * | 4/2019 | ......... | B60H 1/00278 |

OTHER PUBLICATIONS

Machine translation of WO 2018157599 A1 performed on Jun. 22, 2023, Zhang et al. (Year: 2018).*
Machine translation of CN 108263244 A performed on Jun. 22, 2023, Lin et al. (Year: 2018).*
Machine translation of CN 109755689 A1 performed on Jan. 23, 2024, Xiong et al. (Year: 2019).*
Machine translation of WO 2019062935 A1 performed on Jan. 23, 2024, Wu et al. (Year: 2019).*
Feb. 10, 2021 European Search Report issued on International Application No. 20199498.
Communication pursuant to Article 94(3) EPC issued in corresponding CN Application No. 20 199 498.5.

* cited by examiner

POWER BATTERY HEATING SYSTEM AND METHOD USING SOLAR SUNROOF ENERGY

CROSS-REFERENCE TO RELATED APPLICATION

This disclosure claims priority to Chinese Patent Application No. 201910961998.4, filed on Oct. 11, 2019, which is incorporated herein by reference in its entirety.

TECHNICAL FIELD

The disclosure relates to a power battery heating system and method using solar sunroof energy, the system and method being applicable in electric vehicles.

BACKGROUND

Nowadays there are various electric vehicles, such as pure electric vehicles and hybrid power vehicles. Compared with traditional fuel vehicles, electric vehicles have less impact on environment and lower energy consumption and thus are predicted to dominate the vehicle market in the near future.

Power batteries of existing electric vehicles have strict requirements on operational temperature. When the temperature of the power battery is too high or too low, the power battery stops outputting electrical energy to protect itself. When a user parks an electric vehicle in the cold environment for an extended period, it is highly possible the internal temperature of the battery drops below the lowest temperature that allows the vehicle to start. In this case, the vehicle cannot be started.

On the other hand, now some vehicles are equipped with a solar sunroof, which includes a solar cell battery under the glass of a sunroof. Currently, the electric energy converted from solar energy gathered by the solar sunroof is mainly used for allowing the vehicle ventilation system to run continuously to maintain a comfortable temperature inside the vehicle, to expel harmful gases emitted from vehicle components under high temperature, and to prolong the service life of the interior decoration and vehicle electrics. In addition, the electric energy generated by the solar sunroof may also be used for charging the assistant battery of the vehicle.

SUMMARY

The disclosure is to provide a power battery heating system, which can heat the power battery effectively by using the electric energy generated by the solar sunroof.

For this end, the disclosure provides in one aspect a power battery heating system of an electric vehicle, the system including: a heating module configured to heat a power battery of the electric vehicle; a solar sunroof configured to output electric energy; and a sunroof control unit configured to control the operation of the heating module and the electric energy output by the solar sunroof wherein the power battery heating system is configured to start a power battery heating operation using the electric energy output by the solar sunroof when the power battery is not in a high voltage output state and the power battery's temperature is lower than a temperature threshold, the power battery heating operation including: controlling the solar sunroof to output electric energy to the heating module such that the heating module performs heating of the power battery using the electric energy from the solar sunroof.

In one embodiment, the sunroof control unit is configured to receive information about the power battery's temperature, and to terminate the power battery heating operation when the power battery's temperature is higher than a predetermined temperature value.

In one embodiment, the power battery includes one or more battery cells and the power battery's temperature includes the power battery's core temperature, which is an average temperature of the battery cells of the power battery.

In one embodiment, the sunroof control unit is configured to set the solar sunroof in a state for charging an assistant battery of the electric vehicle when the core temperature is higher than the predetermined temperature value.

In one embodiment, the sunroof control unit is configured to receive information about the assistant battery, including the assistant battery's voltage or energy level, and to allow the assistant battery to be charged using the electric energy output by the solar sunroof, when the voltage or energy level of the assistant battery is lower than a threshold.

In one embodiment, the sunroof control unit is configured to receive information about whether there is a failure in the assistant battery and to prohibit charging the assistant battery using the electric energy output by the solar sunroof when there is a failure in the assistant battery.

In one embodiment, the sunroof control unit is configured to set the solar sunroof in one of a group of selectable states when the power battery is in the high voltage output state, the group of selectable states including at least: a state for charging the assistant battery of the electric vehicle, and a standby state not outputting electric energy.

In one embodiment, the heating module includes an infrared heating module, the infrared heating module including a heating sheet in the form of infrared electronic paste or infrared blanket power placed in a battery housing of the power battery, and the heating sheet being applied to different locations of the power battery housing, facing towards battery cells of the power battery respectively.

In one embodiment, the sunroof control unit is configured to receive information about whether there is a failure in the power battery or the heating module, and to prohibit the power battery heating operation when there is a failure in the power battery or the heating module.

In one embodiment, the sunroof control unit is configured to check the output power level of the solar sunroof at a predetermined time interval, and to allow starting of the power battery heating operation when the output power level of the solar sunroof is not lower than a minimum enablement value.

The disclosure provides in another aspect a power battery heating method used in an electric vehicle, possible performed using the power battery heating system described above, the method including: checking whether the power battery is in the high voltage output state and checking the power battery's temperature; and, in the condition that the power battery is not in the high voltage output state and the power battery's temperature is lower than a temperature threshold, controlling the solar sunroof to output electric energy to the heating module so that the heating module performs the heating operation of the power battery using the electric energy output by the solar sunroof.

In one embodiment, the power battery heating method further includes setting the solar sunroof in one of a group of selectable states when the power battery is in the high voltage output state, the group of selectable states including at least: a state for charging the assistant battery of the electric vehicle, and a standby state not outputting electric energy.

The features of the power battery heating system as disclosed here are also applicable in the power battery heating method of the disclosure.

According to this disclosure, the electric energy generated from solar energy absorbed by the solar sunroof is used not only for charging the in-vehicle assistant battery but also, and more importantly, for increasing the temperature of the power battery at a low temperature state. The energy for heating the power battery comes from solar energy, so it does not need to consume the energy of the vehicle batteries.

DETAILED DESCRIPTION OF EMBODIMENTS

An electric vehicle includes a high voltage power battery (with an output voltage of generally 200V or more, in some cases 1000V or more) and a low voltage assistant battery (with an output voltage of 12V, 24V, etc.). The power battery powers up the driving motor of the vehicle. The driving motor itself, or together with an engine, forms the power source of the vehicle. The low voltage assistant battery provides energy for other electricity-consuming devices (such as control system, illumination system, signal system, instrument system, electrics, etc.) of the vehicle.

Figure 1:
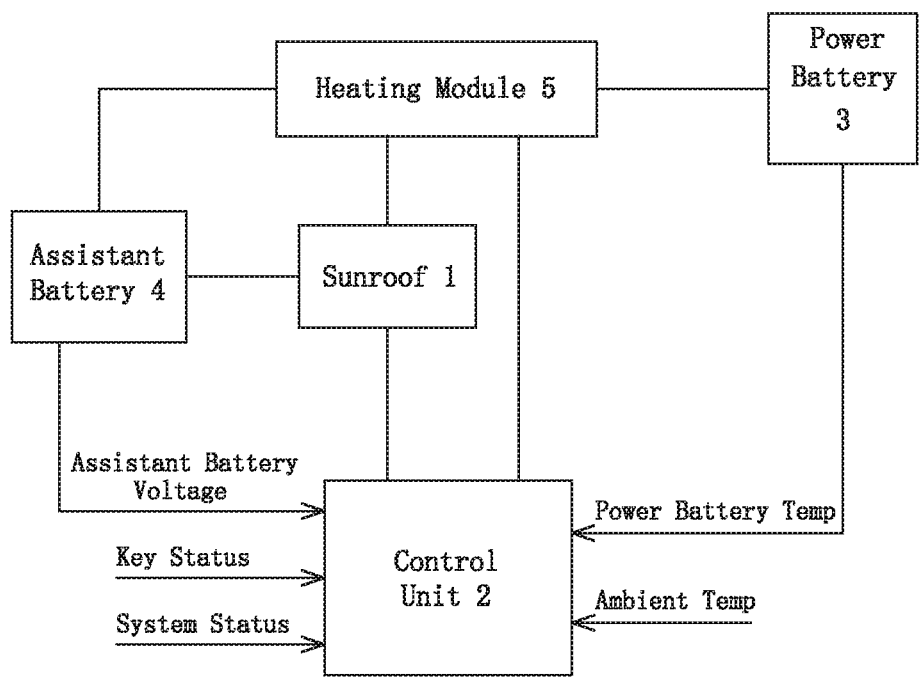
FIG. 1 is a schematic block diagram of a power battery heating system using solar sunroof energy according to an embodiment of the disclosure.

The disclosure uses the electric energy generated by a solar sunroof in the heating of the power battery (which is in a low temperature state) in the electric vehicle. To this end, a power battery heating system based on the solar sunroof according to a possible embodiment of the disclosure is schematically shown in FIG. 1. The power battery heating system mainly includes a solar sunroof 1 configured to convert the solar energy into electric energy that can be used for heating a power battery 3 of the electric vehicle, and a sunroof control unit 2 electrically connected with the solar sunroof 1 and the power battery 3, which is configured to receive information about the status of the solar sunroof 1 and the power battery 3, and is configured to control the use of the electric energy generated by the solar sunroof 1 (including heating the power battery 3 when the power battery 3 is in a low temperature state).

The sunroof control unit 2 is also electrically connected with an assistant battery 4 of the electric vehicle, is configured to receive information about the state of the assistant battery 4 and to control the electric energy generated by the solar sunroof 1 to be used for charging the assistant battery 4. When necessary, the assistant battery 4 may also be used for heating the power battery 3.

The power battery heating system further includes a heating module 5, which is electrically driven by the sunroof 1 and/or the assistant battery 4. The sunroof control unit 2 is electrically connected to the heating module 5 so as to control the operation of the heating module 5.

The heating module 5 may include various suitable electric heating elements, such as heating wires, fluid heating medium, etc. According to a preferred embodiment of the disclosure, the heating module is an infrared module, which includes an infrared heating element in the form of sheet, such as a coating of infrared electronic paste or an infrared blanket, etc. The infrared heating element can be arranged within a housing of the power battery 3 along the interior wall of the housing. The infrared heating element can include multiple sheets distributed in different locations facing corresponding battery elements of the power battery 3 respectively.

The infrared heating module in operation emits infrared ray, which radiates on the battery element of the power battery 3, resulting in heating the battery element directly, requiring no heat conduction from the heating module to the power battery as a thermal conductive hating module. For this reason, the heating speed of the infrared heating module is faster. In addition, another advantage of the infrared heating module is even distribution of the heat without any local overheating. Yet another advantage of the infrared heating module is that the heating module has a function of limiting temperature, avoiding overall overheating.

The power battery heating system of this disclosure is configured to heat the power battery 3 in a state of low temperature such that the temperature of the power battery 3 is maintained at a proper temperature suitable for operation.

In an initial state, the sunroof control unit 2 is configured to check the output power level of the solar sunroof 1 at a certain time interval. If the output power level of the solar sunroof 1 is lower than a minimum enablement value, the sunroof control unit 2 directs the solar sunroof 1 not to output electric energy. If the output power level of the solar sunroof 1 equals to or is higher than the minimum enablement value, the sunroof control unit 2 further checks whether the power battery 3 is in a high voltage output state, for example, by checking the state of the ignition switch of the vehicle. If the power battery 3 is in the high voltage output state, the sunroof control unit 2 checks the voltage state of the assistant battery 4 (the voltage state of the assistant battery 4 reflects its energy level). If the voltage of the assistant battery 4 is lower than a threshold, the sunroof control unit 2 directs the solar sunroof 1 to charge the assistant battery 4; and if the voltage of the assistant battery 4 is not lower than the threshold, the control logic goes back to the initial state. When the power battery 3 is in the high voltage output state, the electric energy of the solar sunroof 1 can also be used for other purposes, such as temperature control of various vehicle components (including the assistant battery 4) and spaces. Alternatively, when the power battery 3 is in the high voltage output state, the solar sunroof 1 may be set in a standby state in which no electric energy is output.

On the other hand, if the power battery 3 is not in the high voltage output state (for example, when the vehicle is shutoff and parked, or in a gas engine driving state for a hybrid vehicle, etc.), the sunroof control unit 2 detects the temperature (Tc) of the power battery 3, particularly, the core temperature (or the temperature of the battery cells). If the temperature Tc of the power battery 3 is higher than a first threshold T1 (the set value of the minimum temperature of the power battery 3 in normal operation), the sunroof control unit 2 determines again whether to charge the assistant battery 4 by the electric energy of the solar sunroof 1; and if the temperature Tc of the power battery 3 is not higher than the first threshold T1, then the sunroof control unit 2 further determines if the temperature Tc of the power battery 3 is lower than a second threshold T2 (the set value of the minimum temperature of the power battery 3 that requires heating, particularly, the minimum temperature of the battery cells that require heating, T2 being lower than T1). If the temperature Tc of the power battery 3 is not lower that the second threshold T2, it continues to monitor the temperature Tc of the power battery 3; and if the temperature Tc of the power battery 3 is lower than the second threshold T2, the sunroof control element 2 controls the heating module 5 to start and supply power to the heating module 5 by using the electrical energy of the solar sunroof 1, The heating module 5 utilizes the electrical energy generated by the solar sunroof 1 to heat the power battery 3. During the period that the power battery 3 is being heated using the electrical energy of the solar sunroof 1, the sunroof control element 2 monitors the temperature of the power battery 3 and stops the operation of the heating module 5 and goes back to initial state when the temperature Tc of the power battery 3 is higher than the first threshold T1.

It can be seen that, according to the disclosure, when the power battery 3 of the vehicle is not in the high voltage output state, and the temperature of the power battery 3 is too low, the electric energy generated by the solar sunroof 1 is used for heating the power battery 3, so it does not need to consume the electric energy of the assistant battery 4. In other conditions, the electric energy generated by the solar sunroof 1 can be used for charging the assistant battery 4 (or for driving the vehicle ventilation/air conditioning system, etc.).

The sunroof control unit 2 may also receive additional information, such as system state information, external environment temperature information, etc., for making supplementary decision. The system state information includes information about the status of the power battery 3, the assistant battery 4 and actuation components (like the heating module 5). If there is any failure (such as insulation failure, failure in the heating module 5, failure in the assistant battery 4, or failure in the power battery 3) preventing proper charging, the function of charging or heating using the energy of solar sunroof 1 is not be initiated even other requirements are met. The external environment temperature information can also be taken into consideration in the control logic.

The sunroof control unit 2 may be formed as an individual control element, or be integrated in the vehicle ECU as a module of the vehicle ECU.

Based on the principle of the disclosure, those skilled in the art can make any suited modifications to the power battery heating system described above.

Figure 2:
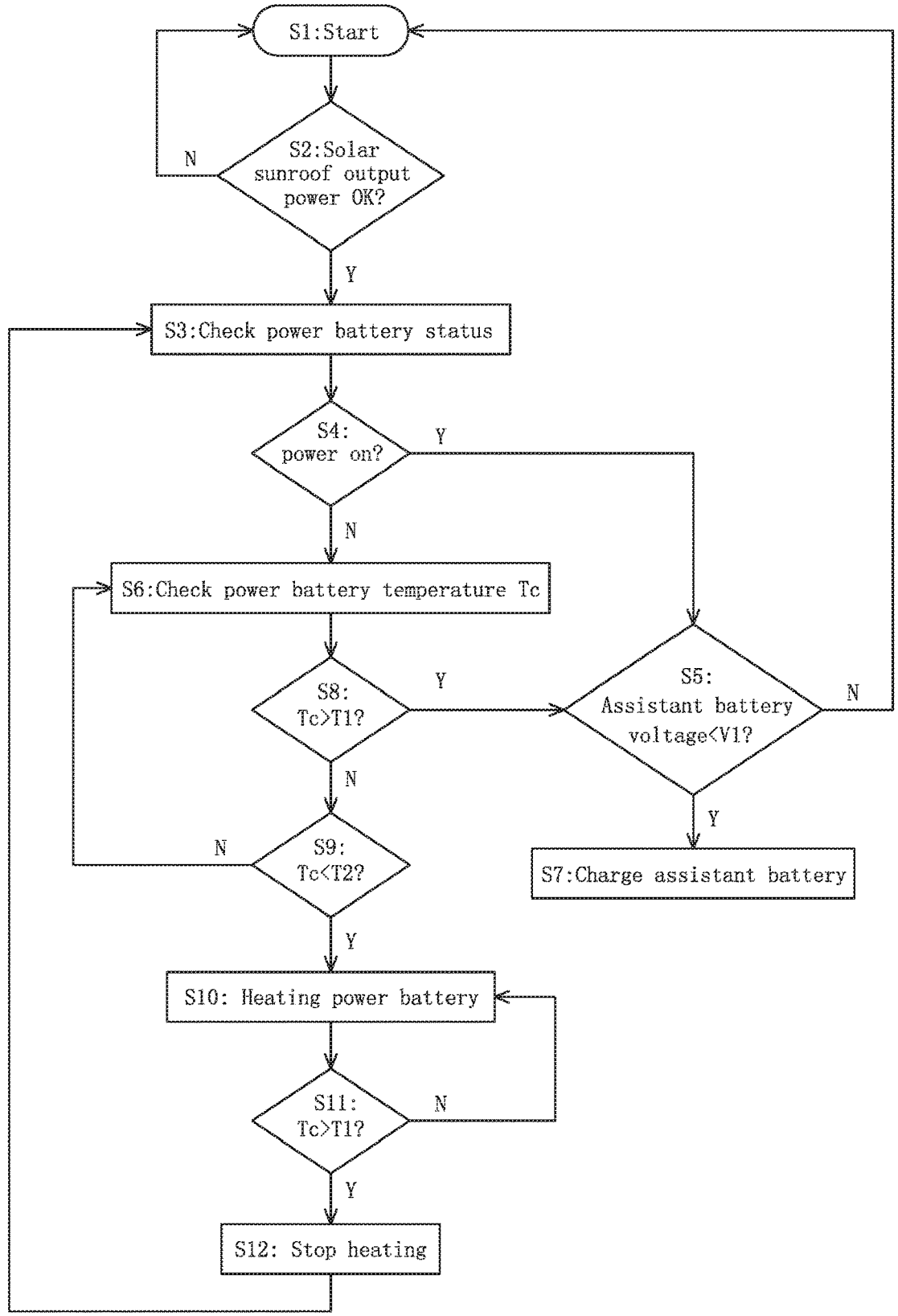
FIG. 2 is a schematic flow chart of a power battery heating method using solar sunroof energy according to an embodiment of the disclosure.

The disclosure also relates to a power battery heating method based on the solar sunroof in the electric vehicle, an embodiment of which is schematically shown in FIG. 2 and will be described below.

Then, in Step S2, it decides whether the output power level of the solar sunroof equals to or is higher than a minimum enablement value. If the determination is "No", the procedure returns back to Step S1; and if the determination is "Yes", the procedure goes to Step S3.

In Step S3, the procedure checks the working state of the power battery.

Then, in Step S4, it determines whether the power battery is in the high voltage output state. If the determination is "Yes", the procedure goes to Step S5; and if the determination is "No", the procedure goes to Step S6.

In Step S5, it determines whether the voltage of the assistant battery of the vehicle is lower than a threshold V1. If the determination is "No", the procedure returns back to Step S1; and if the determination is "Yes", the procedure goes to Step S7. In Step S7, the electric energy generated by the solar sunroof is used for charging the assistant battery. Optionally, when the power battery is in the high voltage output state, Steps S5 and S7 can be substituted by a step in which the solar sunroof is put in a standby state, not outputting electric energy.

In Step S6, the procedure detects the temperature Tc of the power battery, such as the temperature of the electric core/battery cells of the power battery. Then, in Step 8, it determines whether the temperature Tc of the power battery is higher than a first threshold T1. If the determination is "Yes", the procedure goes to Step S5; if the determination is "No", the procedure goes to Step S9.

In Step S9, it determines whether the temperature Tc of the power battery is lower than a second threshold T2 (T2<T1). If the determination is "No", the procedure returns to Step S6; if the determination is "Yes", the procedure goes to Step S10.

In Step S10, the heating module is started. Heating of the power battery is performed by utilizing the electrical energy generated by the solar sunroof.

Then in Step S11, it determines whether the temperature Tc of the power battery is higher than the first threshold T1. If the determination is "No", it returns to Step S10; if the determination is "Yes", it goes to Step 12.

In Step S12, the heating of the power battery is terminated, for example, by stopping the heating module.

Based on the principle of the disclosure, those skilled in the art can make various modifications to the power battery heating method described above, especially to the details in the steps. For example, the control logic can consider the system state information and external environment information in the method.

It can be seen that, according to the disclosure, the electrical energy generated by the solar sunroof absorbing solar energy can be used to charge vehicle mounted assistant battery, and can also be used for increasing the temperature of a power battery in a low temperature state such that the temperature of the battery is maintained above a minimum temperature suitable for operation, at least for power outputting, ensuring both the electric vehicle being started normally and the temperature of power battery being within a proper range, for the benefit of the service life of the power battery. In addition, according to this disclosure, since the energy for heating the power battery comes from solar energy, no energy of the vehicle will be consumed, so efficiency of using the electric energy of the electric vehicle is increased.

In addition, as an optional feature, when using the infrared heating module for heating the power battery, the infrared ray can reach the interior of the power battery to increase the temperature of the power battery directly, as a result, the heating process is faster. Moreover, using infrared ray for heating provides even distribution heat and preventing local overheating, avoiding malfunction of the power battery. Further, infrared heating modules can be easily arranged along the housing of the power battery.

While certain embodiments have been described, these embodiments have been presented by way of example only, and are not intended to limit the scope of the disclosure. The attached claims and their equivalents are intended to cover all the modifications, substitutions and changes as would fall within the scope and spirit of the disclosure.

The invention claimed is:

1. A power battery heating system of an electric vehicle comprising:
    a power battery that powers a driving motor of the electric vehicle;

an assistant battery that provides electric energy to at least a control system, an illumination system, a signal system and an instrument system of the electric vehicle;

a heating module configured to heat the power battery of the electric vehicle, the heating module comprising an electric heating element;

a solar sunroof configured to output electric energy; and a sunroof control unit configured to control operation of the heating module and the electric energy output by the solar sunroof;

wherein the power battery heating system is configured to start a power battery heating operation using the electric energy output by the solar sunroof when the power battery is not in a high voltage output state and the power battery's temperature is lower than a temperature threshold, the high voltage output state being a state of the power battery when an ignition switch of the electric vehicle is turned on, the power battery heating operation comprising: controlling the solar sunroof to output electric energy to the heating module such that the heating module performs heating of the power battery using the electric energy from the solar sunroof without consuming the electric energy of the assistant battery of the electric vehicle;

wherein when the power battery is not in the high voltage output state and the power battery's temperature is higher than the temperature threshold, the electric energy of the solar sunroof is used for charging the assistant battery;

wherein when the power battery is in the high voltage output state, the electric energy of the solar sunroof is used for temperature control of the assistant battery; and wherein the sunroof control unit is configured to check an output power level of the solar sunroof at predetermined times, and to control the solar sunroof to not output electric energy when the output power level of the solar sunroof is lower than a minimum enablement value.

2. The power battery heating system of claim 1, wherein the sunroof control unit is configured to receive information about the power battery's temperature, and to terminate the power battery heating operation when the power battery's temperature is higher than a predetermined temperature value.

3. The power battery heating system of claim 1, wherein the power battery comprises one or more battery cells and the power battery's temperature comprises the power battery's core temperature, which is an average temperature of the battery cells of the power battery.

4. The power battery heating system of claim 3, wherein the sunroof control unit is configured to set the solar sunroof in a state for charging the assistant battery when the core temperature is higher than the predetermined temperature value.

5. The power battery heating system of claim 4, wherein the sunroof control unit is configured to receive information about the assistant battery, including the assistant battery's voltage or energy level, and to allow the assistant battery to be charged using the electric energy output by the solar sunroof, when the voltage or energy level of the assistant battery is lower than a threshold.

6. The power battery heating system of claim 5, wherein the sunroof control unit is configured to receive information about whether there is a failure in the assistant battery and to prohibit charging the assistant battery using the electric energy output by the solar sunroof when there is a failure in the assistant battery.

7. The power battery heating system of claim 6, wherein the sunroof control unit is configured to set the solar sunroof in one of a group of selectable states when the power battery is in the high voltage output state, the group of selectable states including at least: a state for charging the assistant battery of the electric vehicle, and a standby state not outputting electric energy.

8. The power battery heating system of claim 7, wherein the heating module comprises an infrared heating module, the infrared heating module comprising a heating sheet in the form of infrared electronic paste or infrared blanket power placed in a battery housing of the power battery, and the heating sheet being applied to different locations of the power battery housing, facing towards battery cells of the power battery respectively.

9. The power battery heating system of claim 8, wherein the sunroof control unit is configured to receive information about whether there is a failure in the power battery or the heating module, and to prohibit the power battery heating operation when there is a failure in the power battery or the heating module.

10. The power battery heating system of claim 9, wherein the sunroof control unit is configured to allow starting of the power battery heating operation when the output power level of the solar sunroof is not lower than the minimum enablement value.

11. A power battery heating method using a power battery heating system including a power battery that powers a driving motor of an electric vehicle, an assistant battery that provides electric energy to at least a control system, an illumination system, a signal system and an instrument system of the electric vehicle, a heating module configured to heat the power battery of the electric vehicle, the heating module including an electric heating element, a solar sunroof configured to output electric energy, and a sunroof control unit configured to control operation of the heating module and the electric energy output by the solar sunroof, the method comprising:

checking whether the power battery is in a high voltage output state and checking the power battery's temperature by the sunroof control unit, the high voltage output state being a state of the power battery when an ignition switch of the electric vehicle is turned on; and when the power battery is not in the high voltage output state and the power battery's temperature is lower than a temperature threshold, controlling, by the sunroof control unit, the solar sunroof to output electric energy to the heating module so that the heating module performs the heating operation of the power battery using the electric energy output by the solar sunroof without consuming the electric energy of the assistant battery of the electric vehicle;

when the power battery is not in the high voltage output state and the power battery's temperature is higher than the temperature threshold, controlling, by the sunroof control unit, the solar sunroof to output electric energy for charging the assistant battery; and when the power battery is in the high voltage output state, controlling, by the sunroof control unit, the solar sunroof to output electric energy for temperature control of the assistant battery;

wherein an output power level of the solar sunroof is checked by the sunroof control unit at predetermined times, and the solar sunroof is controlled by the sunroof control unit not to output electric energy when the output power level of the solar sunroof is lower than a minimum enablement value.

12. The power battery heating method of claim 11, further comprising setting, by the sunroof control unit, the solar sunroof in one of a group of selectable states when the power battery is in the high voltage output state, the group of selectable states including at least: a state for charging the assistant battery, and a standby state not outputting electric energy.

13. The power battery heating system of claim 1, wherein the assistant battery is utilized for heating the power battery.

14. The power battery heating system of claim 1, wherein the power battery heating operation further comprises: causing the heating module to receive electrical energy from the assistant battery.

15. The power battery heating system of claim 14, wherein the heating module receives electrical energy from only one the solar sunroof or the assistant battery at once.

16. The power battery heating system of claim 14, wherein the power battery heating operation further comprises: causing the heating module to simultaneously receive electrical energy from the solar sunroof and the assistant battery such that the heating module performs heating of the power battery using the electrical energy from both the solar sunroof and the assistant battery.

17. The power battery heating method of claim 11, wherein the assistant battery is utilized for heating the power battery.

18. The power battery heating method of claim 11, wherein the method further comprises:
causing, by the sunroof control unit, the heating module to receive electrical energy from the assistant battery.

19. The power battery heating method of claim 18, wherein the heating module receives electrical energy from only one the solar sunroof or the assistant battery at once.

20. The power battery heating method of claim 18, wherein the method further comprises:
causing, by the sunroof control unit, the heating module to simultaneously receive electrical energy from the solar sunroof and the assistant battery such that the heating module performs heating of the power batter using the electrical energy from both the solar sunroof and the assistant battery.

* * * * *